SELECTIVE CALLING APPARATUS

Original Filed Nov. 3, 1958 3 Sheets-Sheet 1

INVENTOR.
Martin Cooper
BY Mueller & Aichele
Attys

SELECTIVE CALLING APPARATUS
Original Filed Nov. 3, 1958 3 Sheets-Sheet 2
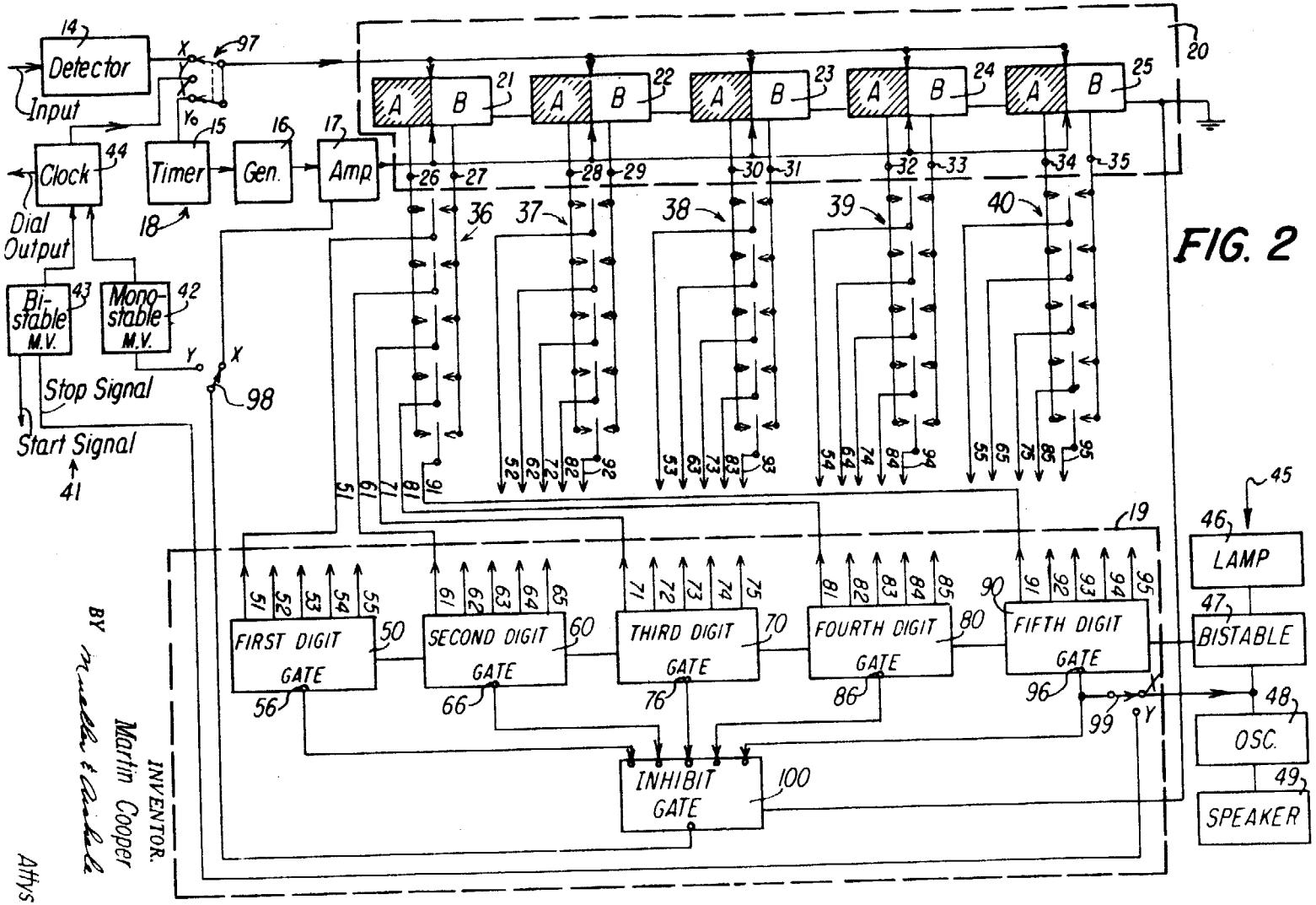
INVENTOR.
Martin Cooper
BY Mueller & Aichele
Attys

SELECTIVE CALLING APPARATUS

Original Filed Nov. 3, 1958 3 Sheets-Sheet 3

INVENTOR.
Martin Cooper

BY Mueller & Aichele

Attys

United States Patent Office

Re. 26,079
Reissued Sept. 20, 1966

26,079
SELECTIVE CALLING APPARATUS

Martin Cooper, Skokie, Ill., assignor to Motorola, Inc., Chicago, Ill., a corporation of Illinois Original No. 3,080,547, dated Mar. 5, 1963, Ser. No. 771,641, Nov. 3, 1958. Application for reissue May 5, 1964, Ser. No. 375,688
12 Claims. (Cl. 340—164)

Matter enclosed in heavy brackets [ ] appears in the original patent but forms no part of this reissue specification; matter printed in italics indicates the additions made by reissue.

This invention relates generally to electronic selector apparatus and more particularly to selective calling apparatus for use in a communications system for providing an indication of the reception of a coded call signal.

Many radio-telephone communication systems in service today are provided with selector apparatus which, for example, permits selective calling of any of a number of mobile stations by dialing and transmitting coded call signals from a base station. Known selector sets are largely composed of electromechanical components which may not operate reliably under conditions of shock and vibration such as are often encountered when the set is used in vehicles. Known selector sets are also relatively bulky and therefore, require considerable mounting space in the vehicle, and comparatively few subscribers can be handled due to the relatively limited calling capacity provided.

Accordingly, it is an object of the present invention to provide a small and compact selector apparatus having high shock and vibration resistance and requiring a minimum of mounting space, thereby facilitating use of the apparatus in vehicles to provide selective calling for a mobile communication system.

Another object of the invention is to provide selector apparatus having simple and reliable electronic circuits which may be variably connected so that identical units provide decoding and selective response for a very large number of calls, thereby greatly reducing the cost of the equipment.

A further object is to provide selective calling apparatus of the binary type having a plurality of selective stages so that a large number of subscribers can be called selectively from a base station of a communication system.

A feature of the invention is the provision of selector apparatus composed nearly entirely of electronic components including transistors, which permits a considerable reduction in size and avoids the use of relatively fragile and non-durable electromechanical components.

Another feature of the invention is the provision of selector apparatus having simple decoding circuits including a binary counter for counting impulses applied thereto in response to reception of a coded call signal, and a plurality of gates for resolving the output of the counter, with the connections of the gates being readily varied from one selector set to another to provide response to different codes.

Another feature of the invention is the provision of simple transistor circuits for cooperation with the decoding circuits described in the preceding paragraph for resetting the counter when an improperly coded call is received, so that there is a selective response only when a properly coded call is received.

Still another feature is the provision of selector apparatus including a plurality of selective stages and control circuits which are operable to control the selective stages in a decoding mode and also in an encoding mode, so that the selector is capable of sending out its own call code as well as responding selectively to an incoming coded call.

The invention is illustrated in the accompanying drawings in which:

FIG. 2 is a block diagram illustrating the principles of the selector set of FIG. 1;

In practicing the invention there is provided electronic selector apparatus including simple and effective decoding, encoding and indicating circuits. The decoding circuit includes a binary counter, preferably composed of several transistor two-state stages, and a plurality of gates, one for each digit of the binary calling code. The counter is advanced by the received call signal and is automatically reset by decoding control circuits after each digit of the call unless the corresponding digit gate responds to inhibit the reset signal. The inhibiting response of each digit gate is dependent upon receiving a "positive" signal from each stage of the counter, and the gates are connected to the counter stages so that this only happens when the digits which have been counted at the point in the call under consideration add up to a predetermined sum. Thus, a first digit gate is controlled by the first call digit, intermediate gates are controlled by the sum of the first and a corresponding number of successive digits, and the last gate is controlled by the sum of all digits. Suitable indicators may be provided to operate when the last gate responds for indicating that the station has been called. Encoding control circuits may be provided to operate the counter and gates in an encoding mode so that the code call of the unit is generated for transmission to a base station where it may be utilized to provide records of the address of the station called. The electrical connections between the individual gates and the counter stages may be readily interchanged to provide many thousands of different selective responses without mechanical or other modification of the apparatus, and this provides large selective calling capacity with relatively inexpensive equipment.

Figure 1:
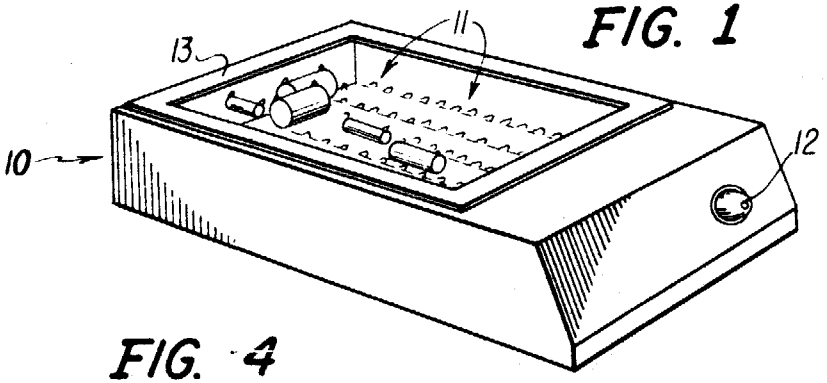
FIG. 1 is a view of a selector set in accordance with the invention.

In FIG. 1 there is shown a selector unit 10 for providing selective calling of a mobile station from the base station of a radio-telephone communication system. The selector unit 10 is relatively small and compact which makes it especially suitable for installation in an automobile or other vehicle where mounting space is limited. The unit may be mounted on the dashboard of the vehicle if this is desired. The cover of the housing 13 is omitted from FIG. 1 to reveal the electronic components 11 so as to illustrate that the unit is almost completely electronic rather than mechanical or electromechanical. As previously mentioned, this increases reliability of operation and permits substantial reduction in size as compared with known selector apparatus. When the mobile station with which the unit 10 is associated is called, an alarm sounds and the lamp 12 lights up to alert the operator.

The manner in which the selector unit 10 decodes incoming calls and responds selectively to a properly coded call may be understood by considering the block diagram shown in FIG. 2. The arrangement of FIG. 2 illustrates how different selective responses may be set up for a large number of selector units, and does not necessarily represent any particular one of the units. As previously mentioned, it is possible to operate the selector unit of FIG. 2 in an encoding mode as well as in a decoding mode. The encoding control section designated generally as 41 includes a monostable multivibrator 42, a bistable multivibrator 43, and a clock 44, and the decoding control section designated generally as 18 includes a timer 15, a generator 16, and an amplifier 17. Switches 97, 98 and 99 may be connected as illustrated so that when the switches are in position X the decoding control section 18 is operative, and when the switches are in position Y the encoding control section 41 is operative.

The transmission which is fed into the selector unit is not restricted to a particular type. However, the transmission may consist of a series of tones alternating between different frequencies such as 600 and 1500 cycles-per-second with the signalling information carried in the transitions between frequencies. A detector 14 is provided to convert the incoming transmission to pulses.

Figure 4:
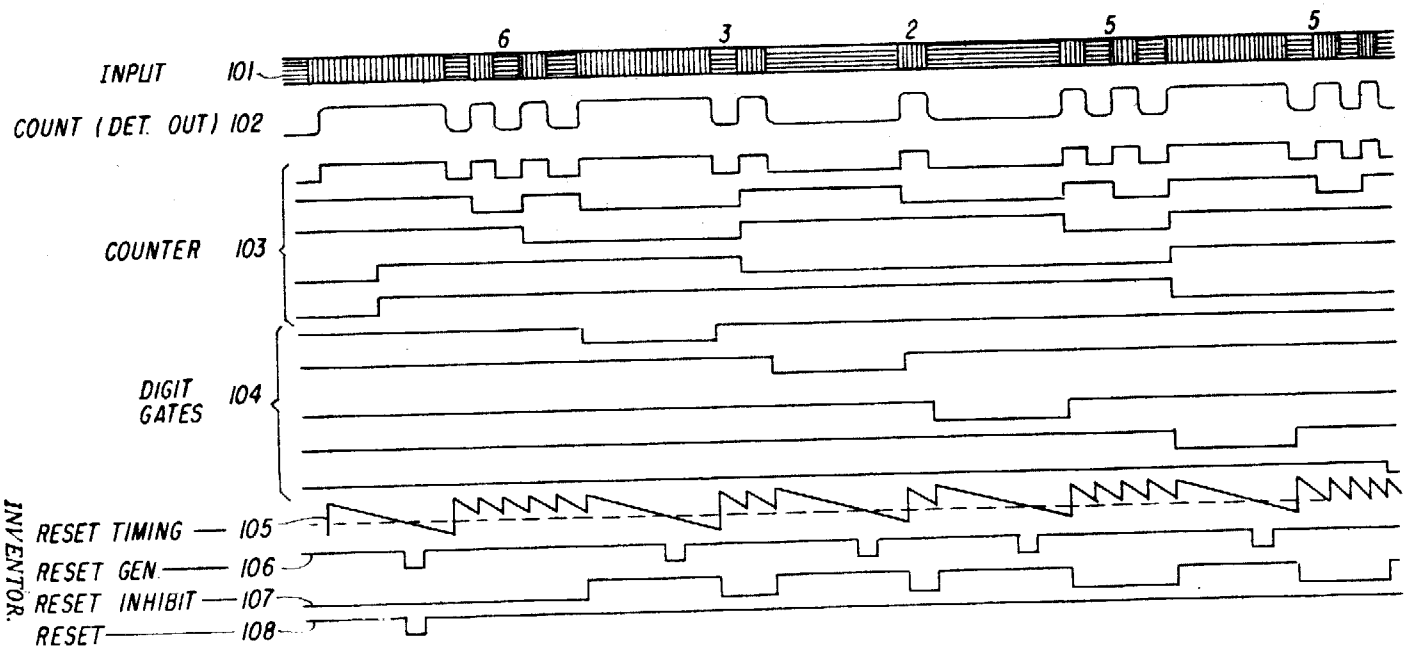
FIG. 4 shows the waveforms for various ones of the units included in FIG. 3.

A typical waveform at the output of the detector 14 is shown in FIG. 4 with the output or "count" waveform 102 corresponding to an alternating tone input represented by the alternately shaded bar 101. The first excursion or pulse edge in the count waveform 102 constitutes a "clearing pulse" which sets the selector unit in a desired initial state. The clearing pulse is followed by information pulses which are grouped in a variety of number combinations to provide the required selection of calls. A call includes five groups of pulses, and the five pulse groups correspond to five digits which for example, may be 63255 as indicated above the waveform 101. If any number is dialed other than the one for which the selector is set, the unit will return to the initial state during the pauses between the pulse groups. This is accomplished by generation between each pulse group of a reset signal in the decoding control section 18 of the selector. If the proper call number is dialed, each pulse group causes the reset signal to be inhibited so that operation of the unit proceeds to the end of the series of pulses without resetting. The indicator section 45 of the unit is then energized, and the oscillator 48 and speaker 49 produce an alerting sound and lamp 46 lights up as previously mentioned. A second clearing pulse is sent a predetermined period after the last group of information pulses to turn off the oscillator 48, but the call lamp 46 remains lit. When the call is answered, power is disconnected from the selector and the call light goes off.

Decoding is accomplished by the counter section 20 and the matrix section 19 of the selector unit. The counter 20 is of the well-known binary type and has five stages 21–25. Each stage has two states which are represented in FIG. 2 by the division of the stages into two parts labeled A and B, with one part being shaded and the other part being unshaded. The shading is intended to indicate that in one state part A is "on" and part B is "off," whereas in the other state part A is "off" and part B is "on."

The "count" signal is applied from the detector 14 to the counter 20, and each excursion or pulse edge drives the first counter stage 21 from one state to the other. Each succeeding stage operates half as frequently as the next preceding stage so that thirty-two excursions may be counted before the counter returns to its initial state, thus completing a cycle. Each counter stage has a pair of the output terminals 26–35 connected thereto, and the combination of outputs appearing at these terminals varies as the counter advances through the cycle.

The various combinations of outputs are resolved by a matrix 19 including five digit gates 50, 60, 70, 80 and 90 of the AND type, one for each digit of the call, and a gate 100 of the OR type which together with the amplifier 17 forms an inhibiting circuit. Every digit gate has five inputs, one connected to each counter stage, and an output connected to the inhibit gate 100. The output 96 of the fifth digit gate 90 is applied to the indicator section 45 and controls the operation of the alarm 48–49 and the lamp 46 as previously explained. The gate 100 causes the amplifier 17 to inhibit the reset signal from the generator 16 when all five of the inputs of any one of the digit gates receives a "positive" signal from the respective counter stages during the pause between pulse groups or digits when the generator 16 is triggered by the timer 15. As described above, either part A or part B of each counter stage is "on" during this pause. The connections between the digit gate inputs 51–55, 61–65, 71–75, 81–85 and 91–95 and the counter outputs 26–35 are selected so that those parts of the counter stages which are "on" after counting the first pulse group or digit are coupled to the first digit gate 50, those parts which are "on" after counting the second digit are coupled to the second digit gate 60, and the remaining connections follow the same pattern. A plurality of switches 36–40 may be provided as illustrated to facilitate selecting between the A and B parts of the counter stages in making the connections for the digit gates if this is desired.

It may be seen that the counter 20 functions to add the digits which correspond to the pulse groups, and each digit gate is connected to select the sum of the associated digit and all preceding digits. The call signal for which the selector unit is set causes the counter to operate all of the digit gates successively, and the last digit gate 90 turns on the alarm 48–49 and the call lamp 46. If any call signal is received other than the one for which the selector unit is set, the counter returns to the zero or initial state during the pause between digits. With this arrangement it is possible to provide at least 18,000 selector units each with a different call code. This number excludes certain codes which might tend to cause spurious response because of different digits adding up to the same sums. It is apparent that the number of compatible calls or codes may be multiplied by merely increasing the number of counter stages and digit gates to accommodate additional digits. It may be noted that it is possible to use a certain number of digit gates to provide selective calling, and to utilize one or more additional digit gates to perform any number of control functions. For example, the first four digits of the call may be utilized to operate four of the digit gates for calling the station, and a fifth digit of the call may be used to operate the last digit gate which may be connected to operate any one of ten sets of contacts for controlling associated equipment in various ways.

The selector unit 10 may be converted into a generator which sends out the call signal for which the unit is set by moving switches 97, 98 and 99 to position Y so that the decoding control section 18 is disabled and the encoding section 41 is conditioned for operation. The encoding operation is started by causing the bistable multivibrator 43 to change states. This actuates the clock 44 which feeds sequential pulses through switch 97 into the counter section 20. When a number of pulses corresponding to the first digit of the call have been counted, the first digit gate 50 responds and actuates the inhibit gate 100. The output of the inhibit gate is applied to the monostable multivibrator 42 which inhibits the clock 44 for a short period of time corresponding to the desired pause or spacing between the digits of the call. At the end of this period, the monostable multivibrator 42 returns to its stable state, and the clock then starts another cycle. This cycle is repeated until all five digit gates have responded. The output of the last digit gate is applied through the switch 99 to the bistable multivibrator 43 causing it to change back to its original state and stop the encoding operation. The dial output is taken directly from the clock 44 and will consist of five groups of pulses with each group representing a digit of the call. The dial output may be converted into any convenient form for transmission to the base station. The encoding feature of the unit is useful in applications where it is important to notify the base station that a two-way path has been established. The encoding provisions may also be used to send a mobile station's call to the base station to operate automatic ticketing apparatus which provides a record of calls made to the mobile station for purposes of computing toll charges.

Figure 3:
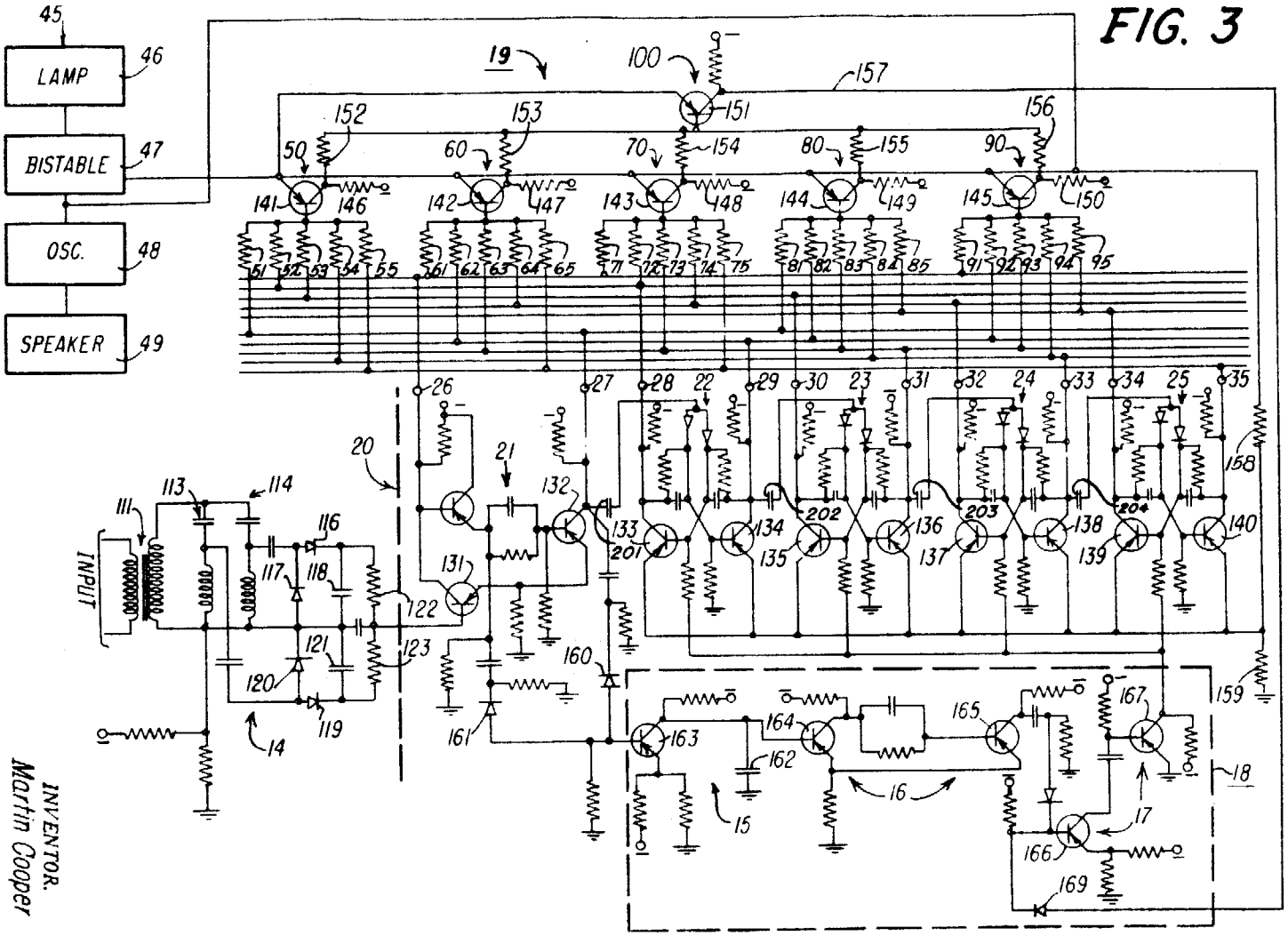
FIG. 3 is a detailed circuit diagram for the selector set of FIG. 1.

In FIG. 3 there is shown the detailed circuit of a selector unit which is preset to respond to the call code 63255 which produces the various waveforms illustrated in FIG. 4. The unit of FIG. 3 may be provided with encoding control circuits in accordance with the previous description if this is desired. The detector 14 which converts the alternating tone input 101 into the count waveform 102 includes a transformer 111 which applies the input tone transmission to a resonant circuit 113 which is tuned to the 1500 cycle tone and another resonant circuit 114 which is tuned to the 600 cycle tone. Diodes 116 and 117 rectify the 1500 cycle tone and supply a positive output which is smoothed by the capacitor 118. Diodes 119 and 120 rectify the 600 cycle tone and supply a negative output which is smoothed by the capacitor 121. The voltage at the junction 124 between the resistor 122 and 123 swings positive and negative producing the count waveform 102 which is applied to the first stage 21 of the counter 20.

The first counter stage 21 includes transistors 131 and 132 which are alternately turned on and off in response to the 600 cycle and 1500 cycle tones respectively. The remaining counter stages including transistors 133–140 are conventional trigger circuits with each including two transistors corresponding to parts A and B illustrated in FIG. 2. The waveforms 103 in FIG. 3 illustrate the manner in which successive counter stages operate from one state to the other at half the frequency of the preceding stage. The input signals for the digit gates 50, 60, 70, 80 and 90 appear at points 26–35 in the collector circuits of the transistors 131–140.

The digit gates respectively include transistors 141–145 having their emitter electrodes connected by resistors 158 and 159 to a point of reference potential and their collector electrodes connected through biasing resistors 146–150 to a source of direct current potential. The base electrodes of transistors 141–145 each have five input resistors 51–55, 61-65, 71–75, 81–85, and 91–95 connected thereto. The operating point of each digit gate transistor is set such that when all five of the associated inputs are positive the transistor is cut off or open circuited, and when one or more of the inputs is negative the transistor is saturated. Thus, the desired selective response of each digit gate occurs when all five inputs receive a positive readout signal from the counter.

As previously mentioned, binary counter 20 shown in FIG. 3 includes a total of five counting stages (21–25), each of which includes a pair of transistors connected in a bistable circuit. Each such counting stage will produce an output pulse excursion for every two input pulse excursions. Stages 21–25 are connected in tandem with stages 21–24 being connected to the next stage by capacitors 201–204 respectively, such that a total of $2^5$, (or 32), pulse excursions are required at the input of stage 21 to produce an output from stage 25 at terminal 35. In the circuit of FIG. 3 the connections between the input resistors for the digit gates and the readout points 26–35 in the counter circuit are predetermined to provide selective response of the call number 63255.

Initially, binary counter 20 may be set at an arbitrary state for zero reference, e.g. transistors 132, 134, 136, 138 and 140 being conductive and transistors 131, 133, 135, 137 and 139 being non-conductive. The first digit 6 advances the counter so that transistors 132, 133, 135, 138 and 140 are conductive, and these transistors are connected respectively to the five input resistors 51–55 so that the transistor 141 of digit gate 50 is cut off or open circuited. Transistor 141 operates to maintain this count level until the second digit 3 advances the counter to a binary 9 so that transistors 131, 134, 136, 137 and 140 are conductive. These transistors are connected to the five input resistors 61–65 so that transistor 142 of digit gate 60 now becomes cut off. It is apparent that the second gate 60 is selective to the sum of associated digit 3 and the preceding digit 6.

Transistor 142 causes this count level to be maintained until the third digit 2 further advances the counter to a count level of eleven (6+3+2) whereby transistors 131, 133, 136, 137 and 140 are rendered conductive to open circuit transistor 143 of digit gate 70 through input resistors 71–75. Similarly, the fourth digit 5 further advances the counter to a count level of sixteen $$(6+3+2+5)$$

to render transistors 132, 134, 136, 138 and 140 conductive, which open circuits transistor 144 of digit gate 80 through input resistors 81–85. The last digit 5 advances the counter still further to a count level of twenty-one (6+3+2+5+5) whereby transistors 131, 134, 135, 138 and 140 are rendered conductive to open-circuit transistor 145 of digit gate 90 through input resistor 91–95. Accordingly all of the transistors 141, 142, 143, 144 and 145 of gates 50, 60, 70, 80 and 90 respectively are cut off in turn.

The inhibit gate 100 includes a transistor 151 with five inputs 152–156 connected respectively to the collector electrodes of transistors 141–145. When transistors 141–145 are cut-off, negative pulses are applied to transistor 151. Transistor 151 is normally cut off and becomes conductive when it receives a negative input from any one of the digit gates. The output of transistor 151 is applied through line 157 and diode 169 to a transistor amplifier 17 in the decoding control section 18 to either pass or block the reset signal depending upon whether the correct digits have been dialed. When the pulses corresponding to the digits of the call number which is set up in the digit gates are received, the reset signal is blocked by the negative pulses applied to the inhibit gate 100 which produces a positive pulse which is applied to diode 169.

The operation of the decoding control or reset section 18 is illustrated by waveform 105–108 of FIG. 2. Signals from the first stage 21 of the counter are applied to the reset timer 15 through the diodes 160 and 161 which differentiate and invert the transitions of stage 21 to produce a negative pulse for each transition. The reset timer includes a transistor 163 having a fairly large capacitor 162 connected in the collector circuit thereof. The transistor 163 is normally cutoff and is turned on by each pulse from stage 21 of the counter, and the capacitor 162 discharges through transistor 163 each time it conducts. When there is a sufficiently long pause such as between pulse groups, the capacitor 162 builds up to a level designated as the triggering level and indicated by the dotted line through waveform 105. The reset generator 16 includes a transistor 164 which is normally off and is turned on when waveform 105 passes the triggering level, and includes another transistor 165 which is normally on and is turned off by the conduction of transistor 164, thus producing the waveform 106. The amplifier 17 including transistors 166 and 167 allows the pulse from the reset generator to pass unless it is inhibited by a negative output from the inhibit gate 100. In the case illustrated, the amplifier 17 is inhibited in accordance with the waveform 107 after each digit of the call number, so that the only generator pulse which is effective to reset the counter is that produced by the clearing pulse at the beginning of the transmission. The resulting reset signal applied to the counter 20 is illustrated by waveform 108 of FIG. 4.

Upon reception and selection of the fifth pulse group, the fifth digit gate 90 energizes the oscillator 48 and speaker 49 and also the call lamp 46. The speaker is on for as long as the counter 20 is held in the fifth state. A clearing pulse may be added at the end of the transmission (not shown in FIG. 4) to step the counter once, and this causes the counter to be reset as previously explained and also shuts off the oscillator. The call lamp 46 is kept lit by a bistable multivibrator 47 which is triggered by the fifth digit gate 90 when it turns off All operating voltages are automatically removed from the selector unit when the call is answered, and the light 46 goes off. Power is automatically reapplied to the selector unit upon completion of the call, and the bistable circuit 47 is forced into a "ready" state so that the call lamp is not lit again until the selector receives another properly coded call.

It is apparent from the foregoing description that the selector unit of the invention provides reliable operation and very high selective calling capacity. Relatively simple decoding and encoding circuits are employed, and the different responses for identical units may be provided very simply. The size of the equipment is substantially reduced as compared with known selector sets, and this may be quite important in certain applications.

I claim:

1. An electronic selector device for providing selective response to a call signal which includes pulse information representing the digits of a code call associated with the device, and for generating such call signal for transmission, said selector device including in combination, a binary counter circuit for counting the pulse information of the call signal, a plurality of gates selectively connected to said counter circuit, said counter circuit actuating said gates in sequential order when the output therefrom corresponds to the count of the first digit and then to the sum of the first digit and the succeeding digits of the call signal in order, decoding control circuit means for controlling said counter circuit and said gates in a decoding mode to provide selective response to the call signal, encoding control circuit means for operating said counter circuit and said gates in an encoding mode for generating the call signal for transmission, and means for selectively conditioning said decoding control circuit means and said encoding control circuit means.

2. An electronic selector device for providing selective calling of one of a plurality of stations in response to a calling transmission wherein transitions from one frequency to another frequency represent digits of a code call, said selector device including in combination, detector means for converting the calling transmission into a count signal wherein excursions from one amplitude level to another correspond to the coded frequency transitions of the calling transmission, a binary counter circuit for sequentially counting the amplitude excursions of the count signal and providing output signals in response thereto, and circuit means selectively connected to said binary counter circuit and responding to said output signals which correspond to the first digit of the code call and then to the sum of the first digit and the succeeding digits in sequential order.

3. Electronic selector apparatus for providing selective calling of one of a plurality of stations in response to a call signal which includes pulse information representing the digits of a code call identified with said apparatus, said apparatus including in combination, a binary counter circuit including a plurality of two-stage electronic stages for counting the pulse information of a call signal, said stages each having a first output portion providing a selected output signal in one state of said stage and a second output portion providing a selected output signal in the other state of said stage, a plurality of gate circuits each being selectively responsive to a predetermined combination of said selected output signals applied thereto, means selectively connecting each of said gate circuits to a selected one of said first and second output portions of each of said stages so that after each digit of the code call identified with said apparatus the associated gate circuit receives said predetermined combination of output signals and is actuated thereby, reset means coupled to said counter circuit for resetting said counter circuit to an initial state in the interval between pulse information corresponding to succeeding digits, and means coupling said reset circuit means to said gate circuits and causing said gate circuits to inhibit the resetting of said counter circuit in response to the sequential actuation of each of said gate circuits, thereby causing said counter circuit to count the pulse information of the calling signal continuously so long as said gate circuits are actuated in turn, and means operated by the one of said gate circuits associated with the last digit of the code call upon reception of the code call identified with said apparatus.

4. Electronic selector apparatus for providing selective calling of one of a plurality of stations in response to a call signal which includes pulse information representing the digits of a code call identified with said apparatus, said apparatus including in combination, a binary counter circuit including a plurality of two-state electronic stages for counting the pulse information of a call signal, said stages each having first and second transistor devices energized alternately by the call signal with each of said transistor devices supplying a selected output in one of said states, a plurality of gate circuits with each of said gate circuits including a transistor device selectively responsive to a predetermined combination of said selected outputs applied thereto simultaneously from all of said stages of said counter circuit, means selectively connecting each of said gate circuits to a selected one of said first and second transistor devices of each of said two-state stages so that after each digit of the code call identified with said apparatus the associated gate circuit receives said predetermined combination of outputs and is actuated thereby, with the connection of said gate circuits to said first and second transistor devices being preselected so that said counter circuit is adapted to actuate each of said gate circuits in turn when the count of said counter circuit equals the sum of the associated digit and all preceding digits of the code call, reset means coupled to said counter circuit for resetting said counter circuit to an initial state in the interval between pulse excursions corresponding to succeeding digits, and means coupling said gate circuits to said reset means for inhibiting the resetting of said counter circuit in response to the sequential actuation of said gate circuits, thereby causing said counter circuit to provide a continuous count through the entire code call as all said gate circuits are actuated in sequence, and means operated by the one of said gate circuits associated with the last digit of the code call upon reception of the code call identified with said apparatus.

5. An electronic selector unit for providing selective calling of a station in response to a calling transmission wherein transition from one frequency to another frequency provides pulse signals representing the digits of a code call identified with the unit, said selector unit including in combination, a binary selective system including a plurality of two-state semiconductor circuits each having first and second portions adapted to be energized alternately by the pulse signals, means connecting said two-state circuits in a chain to form a binary counter for counting the pulse signals, control circuit means including a plurality of sections each being selectively connected to said first and second portions of said two-state circuits such that said two-state circuits are actuated in sequence by the calling signal to provide a continuous count of all digits of the code call identified with said selector unit, with the selection of said connections to said first and second portions providing selective response to the code call identified with said unit, and means for providing an indication of the reception of the code call identified with said selector unit when said two-state circuits complete a count of all digits of such code call.

6. An electronic selector unit as defined by claim 5 wherein said control circuit means further includes switch means for changing said selective connections in order to change the code call of said unit.

7. An electronic selector unit for providing selective calling of a station in response to a calling transmission which provides pulse signals representing the digits of a code call identified with the unit, and for providing such pulse signals for transmission, said selector unit including in combination, a binary selective system including a plurality of two-state electronic circuits each having first and second portions adapted to be energized alternately by the pulse signals of the calling transmission, means connecting said two-state circuits in a chain to form a binary counter for counting pulse signals, control circuit means including a plurality of sections each being selectively connected to said first and second portions of said two-state circuits such that said two-state circuits are actuated in sequence by the pulse signals to provide a continuous count of all digits of the code call identified with said selector unit, with the selection of said connections to said first and second portions providing selective response to the code call identified with said unit, means for providing an indication of the reception of the code call identified with said selector unit when said two-state circuits complete a count of all digits of such code call, a source of uncoded sequential pulse signals coupled to said two-state circuits for actuating the same in sequence, with said control circuit means receiving outputs from said two-state circuits through said selective connections upon actuation of said two-state circuits by said uncoded sequential pulses and translating said outputs to provide pulse signals sequenced according to the code call identified with said selector unit, and means for selectively applying the pulse signals of the calling transmission and the pulse signals from said pulse source to said two-state circuits for selectively operating said selector unit in a decoding mode and an encoding mode.

8. An electronic device for selective operation by a call signal which includes pulse information representing the digits of a code call, said device including in combination; a binary counter circuit including a plurality of two-state electronic stages each having first and second parts energized alternately by the call signal for counting the pulse information thereof, each of said parts of said stages providing an output signal when energized, with the output signals from all said stages representing a digit of the code call, a plurality of "and-gates" each selectively responsive to a particular combination of signals simultaneously applied thereto, means connecting a selected part of each of said stages to each of said "and-gates" so that each "and-gate" is actuated when the output signals from said counter corresponds to a particular digit, said counter circuit sequentially actuating said "and-gates" successively when the output therefrom corresponds to the first digit of the code call and then to the sum of the first digit and the succeeding digits of the code call in order, reset circuit means including a generator circuit for generating a reset signal, a timer circuit responsive to the call signal controlling said generator circuit so that a reset signal is generated thereby after pulse information representing a digit of the code call is applied thereto, an inhibit circuit controlled by each of said "and-gates" and operating when said "and-gates" respond in succession to inhibit the reset signals and operating upon failure of an "and-gate" to respond to apply the reset signal to said counter for resetting the same, and means coupled to said "and-gate" associated with the last digit of the call to provide a control signal only upon reception of a particular code call.

9. An electronic selector device for providing selective calling of one of a plurality of stations in response to a control signal including pulse groups with each having a predetermined number of pulses corresponding to the digits of a code call, said selector device including in combination; a binary counter circuit including a plurality of two-state semiconductor stages, each of said stages having a first output circuit portion selectively energized in one state for providing an output signal and a second output circuit portion selectively energized in the other state for providing an output signal, a plurality of gates each selectively responsive to a particular combination of signals applied thereto, means selectively applying said output signals from one of said first and second output circuit portions of each of said stages to each of said gates, so that each of said gates is actuated when said output signals simultaneously applied from said stages of said counter circuit correspond to the first digit of the code call and then to the sum of the first digit and the succeeding digits of a predetermined code call in order, generator means for generating a reset signal, a timer circuit responsive to the call signal for controlling said generator means so that a reset signal is generated thereby after each pulse group is applied to said counter circuit, an inhibit circuit coupled to said generator means and to said gates, said inhibit circuit being controlled by each of said gates and operating when said gates respond in succession to inhibit the reset signal and operating upon failure of a gate to respond to apply the reset signal to said counter for resetting the same, and means coupled to said gate associated with the last digit of the call and responsive to the reception of the predetermined code call.

10. An electronic selector device for use in a radio telephone system to provide selective calling of one of a plurality of radio receivers in response to a call signal which includes pulse information representing the digits of a code call, said selector device including in combination; a binary counter circuit including a plurality of two-state semiconductor stages each having a first output circuit portion selectively energized in one state and a second output circuit portion seelctively energized in a second state for supplying readout signals, a plurality of "and-gates" each selectively responsive to a particular combination of readout signals applied thereto, means connecting a selected one of said first and second output circuit portions of said counter circuit to each of said "and-gates" so that each "and-gate" is actuated when the readout signals from said counter circuit correspond to a particular digit, said counter circuit actuating said "and-gates" in sequential order when the output therefrom corresponds to the first digit of the code call and then to the sum of the first digit and the succeeding digits of the code call, a generator circuit for generating a reset signal, a timer circuit responsive to the call signal for controlling said generator circuit so that a reset signal is generated thereby after pulse information representing a digit of the code call is applied thereto, an amplifier circuit for applying the reset signal to said counter circuit for resetting the same to an initial state, an "or-gate" controlled by each of said "and-gates" and operating when said "and-gates" respond in succession to inhibit the reset signals, and indicator means operated by the one of said "and-gates" associated with the last digit of the code call in response to the reception of a code call identified with said device.

11. An electronic selector device for providing selective calling of a station in response to a call signal which includes pulse information representing the digits of a code call, and alternately for generating such call signals for transmission, said selector device including in combination; binary counter circuit means responsive to the pulse information of the call signal, a plurality of gates each selectively responsive to a particular combination of signals simultaneously applied thereto, means selectively connecting said counter circuit means to said gates so that each gate is actuated sequentially when the output therefrom corresponds to the first digit of the code call and then to the sum of the first digit and the succeeding digits of the code call in order, decoding means including a reset circuit coupled to said counter circuit means and to said gates, said reset circuit means being controlled by said gates for resetting said counter circuit when any one of said gates does not respond in turn, encoding means including pulse generator means coupled to said counter circuit means and to said gates for supplying sequential pulses and for applying the same to said counter circuit means, said pulse generator means being inhibited by said gates upon actuation thereof by said counter circuit means thereby coding such pulses in accordance with the code call associated with said selector device, and means for selectively conditioning said decoding means and said encoding means for operation so that said selector device is operable in a decoding mode and an encoding mode.

*12. An electronic selector unit for providing selective calling of a station in response to a calling transmission which provides pulse signals representing the digits of a code call identified with the unit, and for providing such pulse signals for transmission, said selector unit including in combination, a binary selective system including a plurality of two-state electronic circuits each having first and second portions adapted to be selectively energized by the pulse signals of the calling transmission, means connecting said two-state circuits in a chain to form binary counter stages for counting pulse signals, said two-state circuits being actuated in sequence by the pulse signals to provide a count of the digits of the code call identified with the selector unit, control circuit means including a plurality of sections, connecting circuit means selectively connecting said sections to said portions of said two-state circuits, with the selection of said connections to said two-state circuits providing selective response to the code call identified with the unit, means for providing an indication of the reception of the code call identified with the selector unit when said two-state circuits count all the digits of such code call, a source of uncoded sequential pulse signals coupled to said two-state circuits for actuating the same in sequence, with said control circuit means receiving outputs from said two-state circuits through said connecting circuit means upon actuation of said two-state circuits by said uncoded sequential pulses and responding to said outputs to provide pulse signals sequenced according to the code call identified with the selector unit, and means for selectively applying the pulse signals of the calling transmission and the pulse signals from said pulse source to said two-state circuits for selectively operating said selector unit in a decoding mode and an encoding mode.*

References Cited by the Examiner

The following references, cited by the Examiner, are of record in the patented file of this patent or the original patent.

UNITED STATES PATENTS

| | | | |
|---|---|---|---|
| 2,373,134 | 4/1945 | Massoneau | 179—84 |
| 2,409,229 | 10/1946 | Smith et al. | 340—168 X |
| 2,411,091 | 11/1946 | Henderson | 340—164 |
| 2,492,179 | 12/1949 | Ransom | 179—84 |
| 2,519,184 | 8/1950 | Gosdoff. | |
| 2,563,127 | 8/1951 | McGoffin | 340—164 |
| 2,600,648 | 6/1952 | Herrick | 340—164 |
| 2,619,528 | 11/1952 | Vroom | 179—84 |
| 2,648,831 | 8/1953 | Vroom | 179—84 |
| 2,903,676 | 9/1959 | Ostendorf | 340—166 |
| 2,938,193 | 5/1960 | Eckert et al. | 340—168 |

NEIL C. READ, *Primary Examiner.*

EVERETT R. REYNOLDS, L. MILLER ANDRUS, T. B. HABECKER, H. T. PITTS, *Assistant Examiners.*